Jan. 8, 1929. 1,697,871
A. J. JANSSON
CUSHION CONNECTION FOR VEHICLE CONSTRUCTION
Filed May 4, 1926  2 Sheets-Sheet 1

Inventor
Axel J. Jansson
By his Attorneys

Jan. 8, 1929.  A. J. JANSSON  1,697,871
CUSHION CONNECTION FOR VEHICLE CONSTRUCTION
Filed May 4, 1926  2 Sheets-Sheet 2
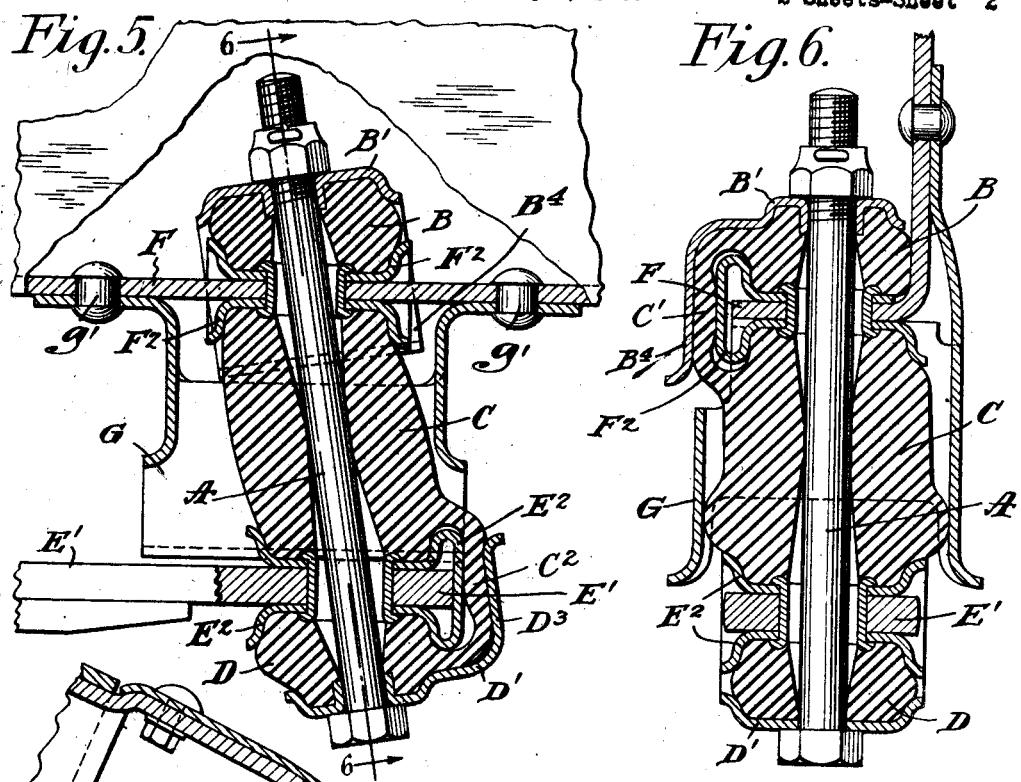
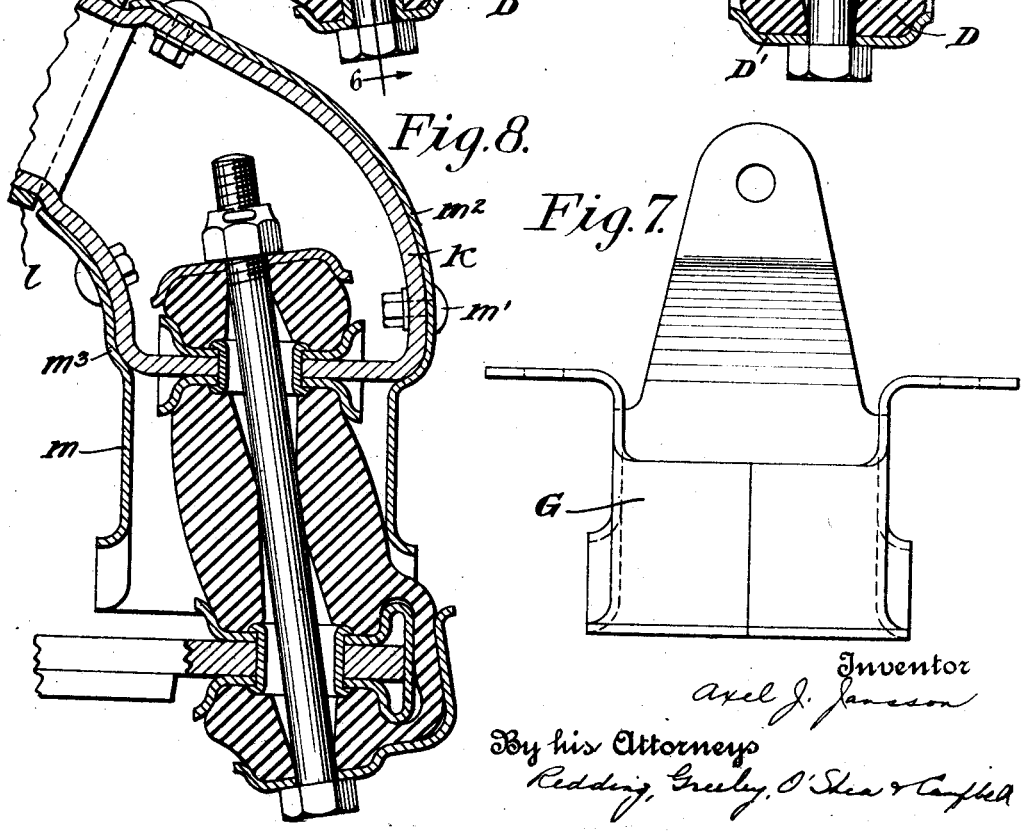
Inventor
Axel J. Jansson
By his Attorneys Patented Jan. 8, 1929.

1,697,871

UNITED STATES PATENT OFFICE.

AXEL J. JANSSON, OF HILLSIDE, NEW JERSEY, ASSIGNOR TO INTERNATIONAL MOTOR COMPANY, OF NEW YORK, N. Y., A CORPORATION OF DELAWARE.

CUSHION CONNECTION FOR VEHICLE CONSTRUCTION.

Application filed May 4, 1926. Serial No. 106,625.

This invention relates to improvements in cushion connections for vehicle construction and has for its general object to provide certain features of design especially adapted to meet conditions of use encountered in some types of vehicles and particularly vehicles of light weight. A further object of the invention is to provide parts for an assembly adapted for such use which themselves shall be simple and inexpensive in construction and light in weight. Still another object is to improve some of the parts employed in such an assembly to facilitate their manufacture and use.

The improvements will be pointed out particularly hereinafter with reference to the embodiment illustrated in the accompanying drawings, wherein:

Figure 5 is a view similar to Figure 2 but showing a non-metallic element in which the various load columns are moulded with connecting webs and improved types of seats are provided.

Figure 6 is a transverse sectional view through the embodiment shown in Figure 5 and taken on the plane indicated by the line 6—6 of Figure 5 and looking in the direction of the arrows.

Figure 7 is a view in side elevation of a type of housing illustrated in Figures 5 and 6.

Figure 8 is a sectional view of a connection similar to that provided in Figures 5 and 6 and adapted for application to the end of the frame of the vehicle.

Figure 1:
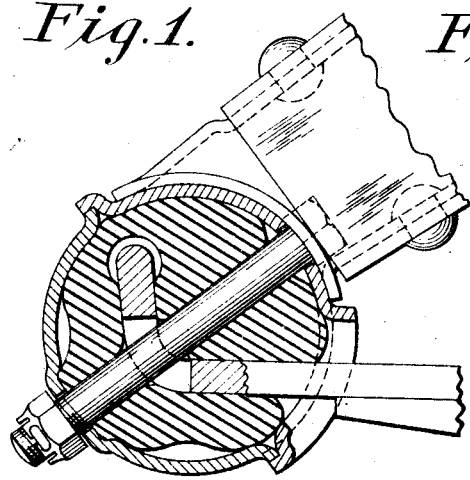
Figure 1 is a fragmentary view partly in vertical section and partly in elevation showing the improved connection applied to the front end of the front spring of a vehicle.

As this description proceeds it will appear that the constructions illustrated herein are characterized by the provision of a rigid clamping element for the connection such as a bolt swiveled at one end and adapted to conform to movements of the non-metallic connector, the work of the stud being to hold the parts together while not resisting their action and the work of the non-metallic material being to provide a wholly non-metallic union between the spring and frame while transmitting all of the load forces and yieldingly resisting excessive lateral and longitudinal movements of the spring. As far as is known no swiveling clamp member has been mounted in such relationship to a wholly non-metallic connection and support. The underlying principle embodied in the present design will appear clearly from Figure 2 where the bolt $a$ extends through columns of rubber $b$, $c$ and $d$, and through a slot $e$ in a supporting spring $e'$. The frame of the member supported by the spring $e'$ is indicated at $f$ and the bolt $a$ passes freely through an enlarged aperture $f'$ therein. The various columns of non-metallic yielding material employed in effecting the desired connection and support are so seated and held in such relation to their respective seats by the bolts $a$ as to prevent displacement thereof with respect to the elements engaged. For instance, the upper column $b$ has its upper face engaged with a seat $b'$ whose movement is limited by engagement with the head $a'$ of the bolt $a$. This column seats on its lower surface directly on the frame $f$. The intermediate column $c$ seats within a depending cover $g$, a suitable form for which appears most clearly from Figure 4. This cover $g$ may be riveted or otherwise secured to the frame $f$ by rivets $g'$. The form and dimensions of the cover with respect to the column $c$ are such that lateral movements of the column incidental to side sway are kept within well defined limits by the side walls $g^2$ while the end walls $g^3$ of the cover flare downwardly and outwardly and do not confine the movements of the column so much, free elongation of the spring $e'$ thereby being permitted. The upper end of the housing $g$ snugly embraces the upper end of the column $c$ thereby constituting a seat for it although the top surface of the column may rest directly against the frame $f$. The lower end of the column $c$ may engage a seat $h$ provided therefor and so formed and assembled, if desired, as to extend through the slot $e$ in the spring $e'$ and be upset on the lower face of the leaf as indicated at $h'$. This is a detail which is believed to embody certain practical advantages although the invention in its broader phases is not limited to it. By extending the metal of the seat $h$ through the slot and upsetting it in the manner described a seat is provided on the underside of the leaf $e'$ and on this seat may rest the upper end of the lower column $d$ whereby this column is held against displacement with respect to the spring. The lower end of the column $d$ engages an independent seat $d'$ which is held against movement by the nut $a^2$ threaded on the lower end of the bolt $a$ which extends through all of the columns described. The form and dimensions of the opening $f'$ in the frame $f$ and the slot $e$ in the leaf $e'$ are such as to permit the bolt $a$ to swing freely in all angular directions to an extent sufficient to conform to deformation of the columns $b$, $c$ and $d$ under forces to which the spring $e'$ and frame $f$ may be subjected. The parts when assembled are assembled under compression, the nut $a^2$ being set up to bring about the desired degree of compression. The load is carried by the column $c$. Rebound is resisted yieldingly by the columns $b$ and $d$. The column $b$ affords a swiveling support for the bolt $a$. Side sway is resisted by engagement of the column $c$ with the side walls of the housing $g$ as indicated in Figure 3. Elongation of the spring $e'$ is permitted with comparative freedom although the flaring end walls $g^3$ of the housing $g$ are engaged by the end walls of the column $c$ to check this elongation yieldingly within desired limits.

In Figure 1 a suitable type of connection for the front end or so-called pivot end of a spring is illustrated, this type of connection, however, not being the subject matter of the present improvements.

Figure 2:
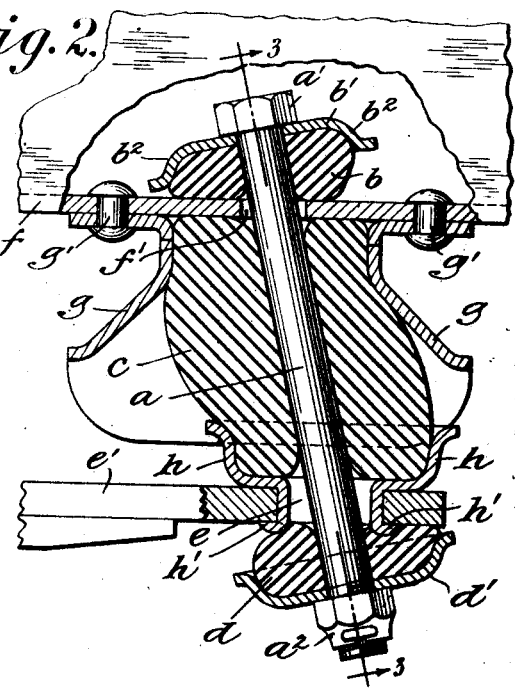
Figure 2 is a similar view at the rear end of the spring shown in Figure 1.
Figure 3:
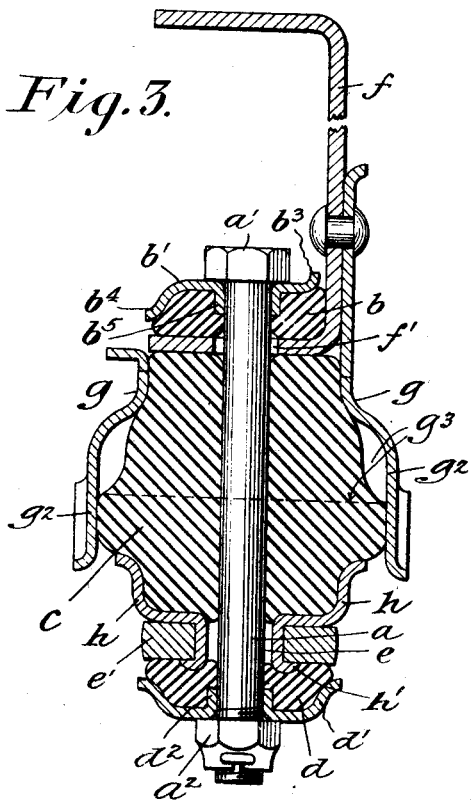
Figure 3 is a view in transverse section through the parts shown in Figure 2 and taken on the plane indicated by the line 3—3 of Figure 2 and looking in the direction of the arrows.
Figure 4:
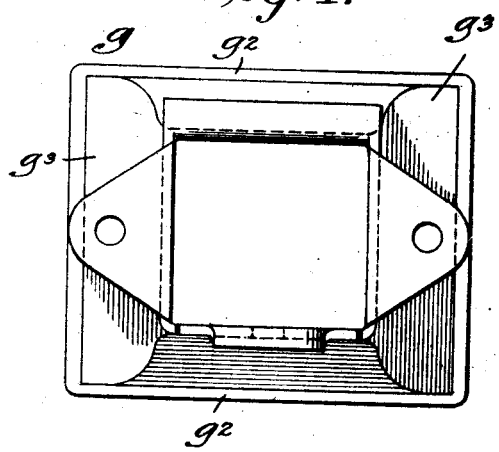
Figure 4 is a view in plan of a suitable housing for the deformable column adapted to limit lateral movements thereof.

A further detail in connection with the seats appears from a comparison of the views of seat $b'$ shown in Figures 2 and 3. As appears from Figure 2 the seat $b'$ has similar flanges $b^2$ at its front and rear edges which hold the column $b$ against displacement. In Figure 3 it appears that the seat may be turned up at its inner edge $b^3$ so as to cooperate with the vertical frame member $f$ in holding the column against displacement while the outer edge $b^4$ is turned down in general conformity to the flanges $b^2$. Further, the seat $b^2$ where the bolt $a$ passes through may be stamped out and the metal bent inward at opposite sides of the bolt as indicated at $b^5$. The same is true of the seat $d'$ for the lower column, the stamped out metal being indicated at $d^2$.

The assembly shown in Figures 5 and 6 is substantially similar in principle to that described above. The parts are so arranged, however, that the three columns of non-metallic material B, C and D may be moulded with connecting webs C' and C², respectively, disposed, however, in planes at 90° to each other. This construction not only facilitates manufacture but affords additional columns to do useful work. For instance, the seat B' for the upper column is extended downwardly at its outer edge as indicated at B⁴ to back up the column C' and the frame F carries a vertically disposed metal plate F² which engages the inner face of the column C'. In similar manner the seat D' to the lower column D is extended upwardly at its rear edge to provide a plate D³ engaging the face of the connecting column C² while the leaf E' carries at its end a vertical metal plate E² which engages the inner face of the said column. The flanges B⁴ and D³ further serve to help enclose somewhat the rubber of the non-metallic connection and the housing G is formed accordingly. The relationship of parts, is, however, substantially the same as before described in that the walls of the housing may be engaged by the middle column C to limit effectively side sway and spring elongation. Swiveling action of the clamping bolt A is afforded as heretofore described although, if desired, the openings through the various columns may be moulded with a taper, as illustrated, to permit the bolt to assume various angular positions without directly pressing to any appreciable extent on the material. For instance, the central column C may have its bore reversely tapered so that the bolt may assume the relationship indicated in Figure 5 when the spring elongates. It will also be noticed that the metal elements F² and E² may be extended and so formed as to comprise seats for the proximate columns of rubber.

The construction in Figure 8 shows the application of a similar non-metallic connector to an assembly at one end of the frame of a vehicle. In place of the usual channel section, parts are mounted on a bracket $k$ which may be so shaped as to be united with the frame $l$ at its end. The depending housing $m$ may be shaped for securing to the bracket $k$ by short bolts $m'$. All of the other elements of the assembly are substantially as heretofore described. One arm $m^2$ of the housing $m$ may underlie the end of the bracket $k$ while the other arm $m^3$ may extend up in intimate engagement with the underside of the bracket.

Changes in details of construction may obviously be made without changing the principle of operation. The principal characteristic of the device is that the load is transmitted directly downward to the supporting spring through a column of rubber under compression while the retaining element does not take the load but confines the parts in desired assembled relation, other rubber columns being employed to afford the desired swiveling action for the retaining member and also to check rebound.

What I claim is:

1. A spring suspension comprising in combination with the supporting element and the supported element, a column of non-metallic yielding material interposed between the two elements to transmit the load directly from one to the other, a rigid retaining element passing through the supporting element, the column and the supported element adapted to maintain the non-metallic material against displacement with respect to the two first named elements, and other columns of rubber at either ends of the rigid member to support the same with capacity for swiveling movement while resisting yieldingly separation of the supporting and supported elements.

2. A spring suspension comprising in combination with a supporting spring and a supported frame, opposed seats on the spring and frame, a column of non-metallic yielding material disposed between said seats to transmit the load directly from the frame to the spring, a rigid retaining member passing through the frame, the column and the spring and maintaining the column in its seats, means to mount the rigid member with capacity for swiveling movements to conform to deformation of the column, and means carried with the frame to limit lateral movements of the column under side sway.

3. A spring suspension comprising in combination with a supporting spring and a supported frame, opposed seats on the spring and frame, a column of non-metallic yielding material disposed between said seats to transmit the load directly from the frame to the spring, a rigid retaining member passing through the frame, the column and the spring, and maintaining the column in its seats, a second column of non-metallic yielding material disposed above the upper seat for the first named column and supporting the bolt with capacity for swiveling movements, a third column of non-metallic yielding material disposed beneath the spring and through which the bolt passes, and seats carried on the bolt for the two last named columns.

4. A spring suspension comprising in combination with a supporting spring and the supported frame, a column of non-metallic yielding material interposed directly between the frame and spring to transmit the load to the spring, a second column above the frame and a third column below the spring, a rigid retaining member passing through all of said columns and having capacity for swiveling movements under deformation of the first named column, and a depending housing carried with the frame to partially enclose the first named column and limit its lateral movements.

5. As an article of manufacture a cushion connection of the character described comprising more than two separate columns of rubber moulded with joining webs, and disposed coaxially with respect to one another.

6. As an article of manufacture a cushion connection of the character described comprising more than two separate columns of rubber moulded with joining webs disposed in different planes, the columns being coaxial.

7. As an article of manufacture a cushion connection of the character described comprising a plurality of compression columns of rubber moulded with tapered bores therethrough to receive a rigid stud.

This specification signed this 30th day of April A. D. 1926.

AXEL J. JANSSON.